United States Patent
Ibrahim

(10) Patent No.: US 6,785,611 B2
(45) Date of Patent: Aug. 31, 2004

(54) DRIVER ALERT FOR VEHICLE WITH ADAPTIVE CRUISE CONTROL SYSTEM

(75) Inventor: Faroog Abdel-kareem Ibrahim, Dearborn, MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 51 days.

(21) Appl. No.: 10/209,771

(22) Filed: Aug. 1, 2002

(65) Prior Publication Data

US 2004/0024529 A1 Feb. 5, 2004

(51) Int. Cl.[7] .......................... G01S 13/93; B60Q 1/100
(52) U.S. Cl. ...................... 701/301; 701/117; 340/435; 340/436; 340/903; 180/169; 367/909; 382/106
(58) Field of Search ................................ 701/301, 117, 701/118; 340/435, 436, 437, 903, 904; 180/169; 367/909; 382/106

(56) References Cited

U.S. PATENT DOCUMENTS

| | | | |
|---|---|---|---|
| 4,257,703 A | * 3/1981 | Goodrich | 356/4.03 |
| 5,659,304 A | 8/1997 | Chakraborty | 340/903 |
| 5,670,953 A | 9/1997 | Satoh et al. | 340/903 |
| 5,754,099 A | * 5/1998 | Nishimura et al. | 340/435 |
| 6,161,071 A | 12/2000 | Shuman et al. | 701/48 |
| 6,223,117 B1 | 4/2001 | Labuhn et al. | 701/93 |
| 6,265,990 B1 | 7/2001 | Isogai et al. | 340/903 |
| 6,311,123 B1 | * 10/2001 | Nakamura et al. | 701/96 |
| 6,324,465 B1 | 11/2001 | Teramura et al. | 701/96 |
| 2002/0016663 A1 | 2/2002 | Nakamura et al. | 701/96 |

* cited by examiner

Primary Examiner—Thomas G. Black
Assistant Examiner—Arthur D. Donnelly
(74) Attorney, Agent, or Firm—MacMillan, Sobanski & Todd LLC

(57) ABSTRACT

A drive alert system and method for a host vehicle having an adaptive cruise control system. The driver alert system determines if the adaptive cruise control system is on or off and adjusts the factors for determining braking capability and delay, when determining driver alert situations. The system and method also evaluates a vehicle situation relative to a phase plane, having axes of relative speed and relative acceleration of the host vehicle relative to a preceding vehicle, and compares the vehicle situation to a threshold for a particular region of the phase plane.

20 Claims, 4 Drawing Sheets

US 6,785,611 B2

DRIVER ALERT FOR VEHICLE WITH ADAPTIVE CRUISE CONTROL SYSTEM

BACKGROUND OF INVENTION

The present invention relates to a driver alert system for a vehicle, and more particularly to a driver alert system for a vehicle having adaptive cruise control.

Cruise control systems for automotive vehicles have been available for years. Typically, for the basic systems, the operator attains the desired vehicle speed and initiates the cruise control system. The vehicle then travels at the set speed unless the operator applies the brakes or turns off the system. With advances in electronics and sensor technology, adaptive cruise control (ACC) systems are becoming available that not only maintain the set vehicle speed, but also include a radar, laser or other type of sensing system, that will detect if the host vehicle is following too closely behind a preceding vehicle and automatically apply the vehicle brakes in order to increase this distance. If particularly close, then the system may also alert the operator of the condition. These types of systems typically use the distance between the vehicles (range), relative speed between the vehicles, and a preset time threshold to determine if an alert is desirable. However, these systems have tended to produce a significant amount of nuisance alerts, where the alert is activated when the relative conditions between the two vehicles does not really warrant the alert.

Thus, it is desirable to have a driver alert system that will accurately determine when a vehicle operator alert may be needed in a vehicle with an adaptive cruise control system.

SUMMARY OF INVENTION

In its embodiments, the present invention contemplates a driver alert system for alerting a host vehicle operator relative to a preceding vehicle, with the host vehicle having an adaptive cruise control system. The driver alert system has a plurality of inputs that receive a vehicle speed for the host vehicle, a relative speed between the host vehicle and the preceding vehicle, and a range between the host vehicle and the preceding vehicle. There is a requested braking determiner that calculates a first braking factor if the adaptive cruise control system is on and calculates a second braking factor if the adaptive cruise control system is off, and a delay determiner that calculates a first delay time to braking if the adaptive cruise control system is on and calculates a second delay time to braking if the adaptive cruise control system is off. A host vehicle deceleration predictor has inputs in communication with the requested braking determiner and the delay determiner. The driver alert system also includes a preceding vehicle deceleration determiner, and a range predictor that has inputs in communication with the host vehicle deceleration predictor, the preceding vehicle deceleration determiner, the relative speed between the host vehicle and the preceding vehicle, and the range between the host vehicle and the preceding vehicle. There is also an alert threshold generator, and an alert decision determiner that is in communication with the alert threshold generator and the range predictor.

The present invention further contemplates a method of detecting a driver alert situation for an operating host vehicle that precedes a preceding vehicle, the method comprising the steps of: determining a difference in speed between the host vehicle and the preceding vehicle; determining a difference in a rate of acceleration between the host vehicle and the preceding vehicle; determining a range between the host vehicle and the preceding vehicle; detecting if an adaptive cruise control system is on or off; determining an alert need, based upon the difference in speed and the difference in acceleration, if an adaptive cruise control deceleration is sufficient for the host vehicle to avoid the preceding vehicle if the adaptive cruise control system is on, and if a possible situation exists where the host vehicle will not avoid the preceding vehicle due to predicted inputs from a vehicle operator if the adaptive cruise control system is off; and providing a driver alert when the adaptive cruise control is detected as on and the adaptive cruise control deceleration is not sufficient for the host vehicle to avoid the preceding vehicle, and when the adaptive cruise control is detected as off and the possible situation exists that the host vehicle will not avoid the preceding vehicle.

An advantage of the present invention is that a host vehicle operator will be alerted by a driver alert system of particular situations regarding the adaptive cruise control braking relative to a preceding vehicle, if the ACC is on, and the host vehicle operator will be alerted to particular situations regarding the operator reaction time and braking relative to a preceding vehicle, if the ACC is off.

Another advantage of the present invention is that the driver alert system can alert the driver at different levels, such as visual and audible, based upon a system severity determination.

A further advantage of the present invention is that the driver alert system minimizes nuisance driver alerts that can occur.

DETAILED DESCRIPTION

Figure 1:
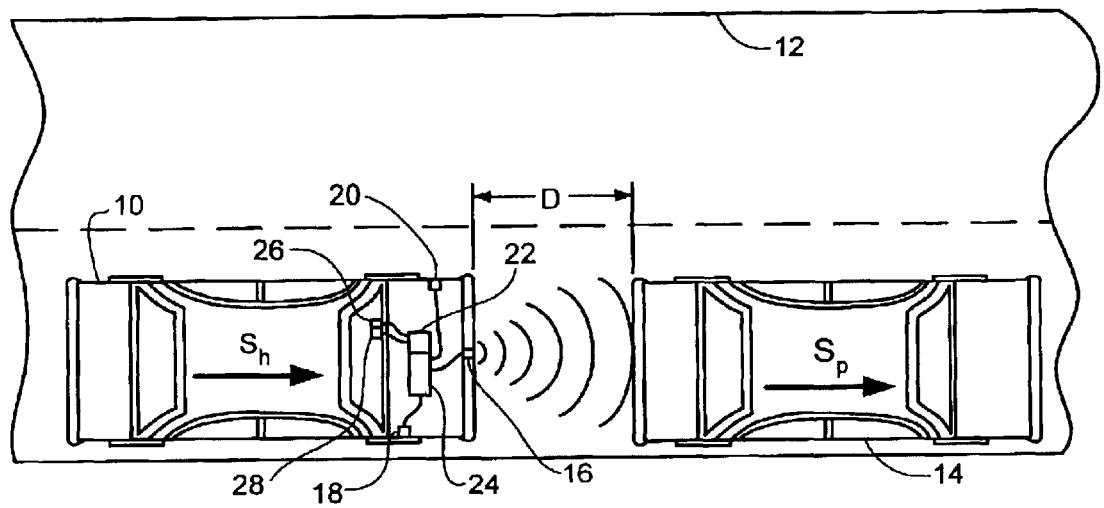
FIG. 1 is a schematic view of a host vehicle and preceding vehicle traveling on a roadway, in accordance with the present invention.

FIG. 1 illustrates a host vehicle 10 traveling at a forward speed $S_h$ on a road 12. The host vehicle 10 is following a preceding vehicle 14, which is traveling in the same general direction at a speed of $S_p$. The host vehicle 10 includes a radar system 16, or similar type of system, that can determine at least the distance between the two vehicles (range D) and the relative speed U between the host vehicle 10 and the preceding vehicle 14. The relative speed is $U = S_p - S_h$. The host vehicle 10 also includes a speed sensor 18 for determining the speed $S_h$ of the host vehicle. Optionally, a supplemental sensor system, such as a yaw rate sensor system 20 may be employed, which can provide an additional indication if the preceding vehicle 14 is of interest to the host vehicle 10. The sensor systems 16, 18, 20 communicate with a driver alert system 22, which is part of an adaptive cruise control system 24. The driver alert system 22 is also in communication with a visual alert indicator 26 (such as a light on the vehicle instrument panel), and an audible alert indicator 28 (such as a buzzer or chime in the vehicle passenger compartment).

Figure 2:
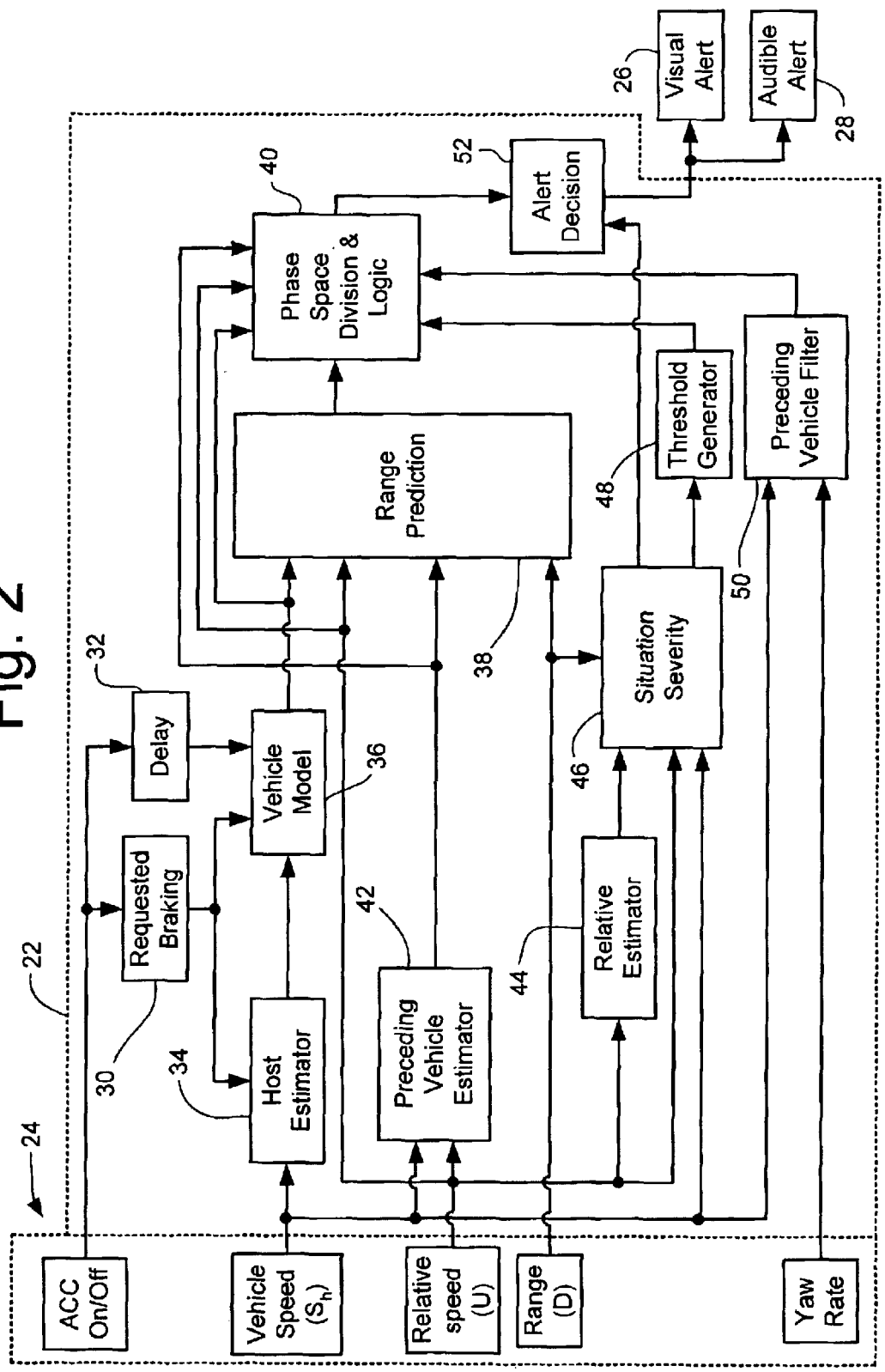
FIG. 2 is a schematic diagram of a driver alert system in accordance with the present invention.

FIG. 2 illustrates the driver alert system 22, which may take the form of hardware, software, or a combination of the two. The driver alert system 22 detects if the ACC system 24 is on or off, and this information is fed to a requested braking module 30 and a delay module 32. The requested braking module 30 determines the raking capability of the ACC system 24 if the ACC is on, or estimates the braking capability of the host vehicle operator if the ACC is off. The braking capability values may be predetermined, based on operating conditions, or learned and adjusted over time based on vehicle and operator response. The requested braking module 30 output is communicated to a host estimator module 34 and a vehicle model module 36. The delay module 32 determines the ACC system delay until braking can begin if the ACC is on, or estimates the operator reaction time if the ACC is off, and its output is communicated to the vehicle model module 36. The host estimator also has an input for receiving the vehicle speed, and an output to the vehicle model module 36. The host estimator module 34 and vehicle model module 36 predict the host vehicle deceleration capability, with the output of the vehicle model module 36 communicated to a range prediction module 38 and a phase space division and logic module 40.

A preceding vehicle estimator module 42 has inputs for the host vehicle speed $S_h$ and the relative speed U. The preceding vehicle estimator module 42 estimates the current acceleration of the preceding vehicle and has an output that communicates with inputs of the range prediction module 38 and the phase space division and logic module 40. The range prediction module 38 also has inputs for the range D and the relative speed U. The phase space division and logic module 40 also has an input for the relative speed U.

A relative estimator module 44 has an input for the relative speed U, and an output communicating to a situation severity module 46. The situation severity module 46 also includes inputs for the vehicle speed $S_h$ and relative speed U, and outputs communicating to the phase space division and logic module 40 and a threshold generator module 48. The threshold generator also has an output in communication with the phase space division and logic module 40. The situation severity module 46 determines if the situation between the host vehicle and the preceding vehicle is a high severity or low severity situation, and the threshold generator 48 determines alert thresholds for different regions of a phase space (discussed below).

The phase space division and logic module 40 also has an input that communicates with an optional preceding vehicle filter module 50, which has inputs that receive yaw rate and host vehicle speed $S_h$. The preceding vehicle filter module 50 determines if the preceding vehicle is actually of interest to the host vehicle. While the yaw rate sensor and preceding vehicle filter module 50 are supplemental to the driver alert system 22, it is preferable to have them in the system in order to further reduce the number of nuisance alerts that a host vehicle operator may receive.

The range prediction module 38 predicts the range between the host vehicle and the preceding vehicle at a future time—with the future time being the time needed to match the host vehicle speed to the preceding vehicle speed. The range prediction module 38 has an output that communicates the predicted range to an input of the phase space division and logic module 40. The phase space division and is logic module 40 determines the region of phase space for the particular vehicle situation and compares the situation to the threshold for that region. The phase space division and logic module 40 has an output that communicates with an alert decision module 52, which in turn has an output that communicates with the visual alert 26 and the audible alert 28.

Figure 3:
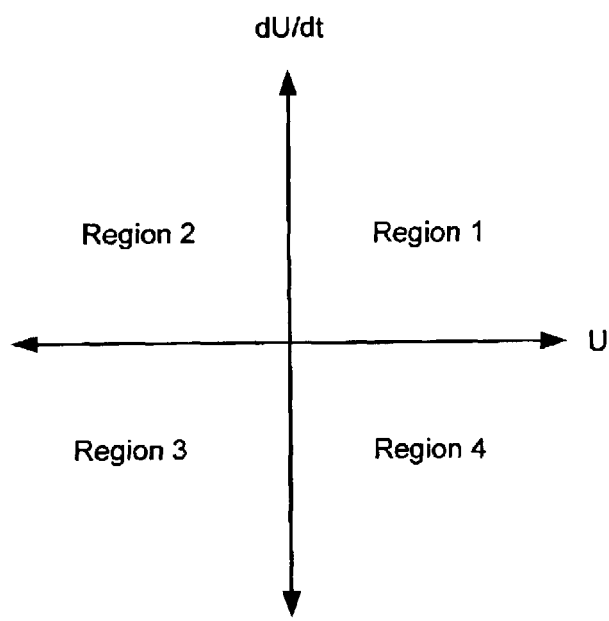
FIG. 3 is a phase plane division graph in accordance with the present invention.
Figure 4A:
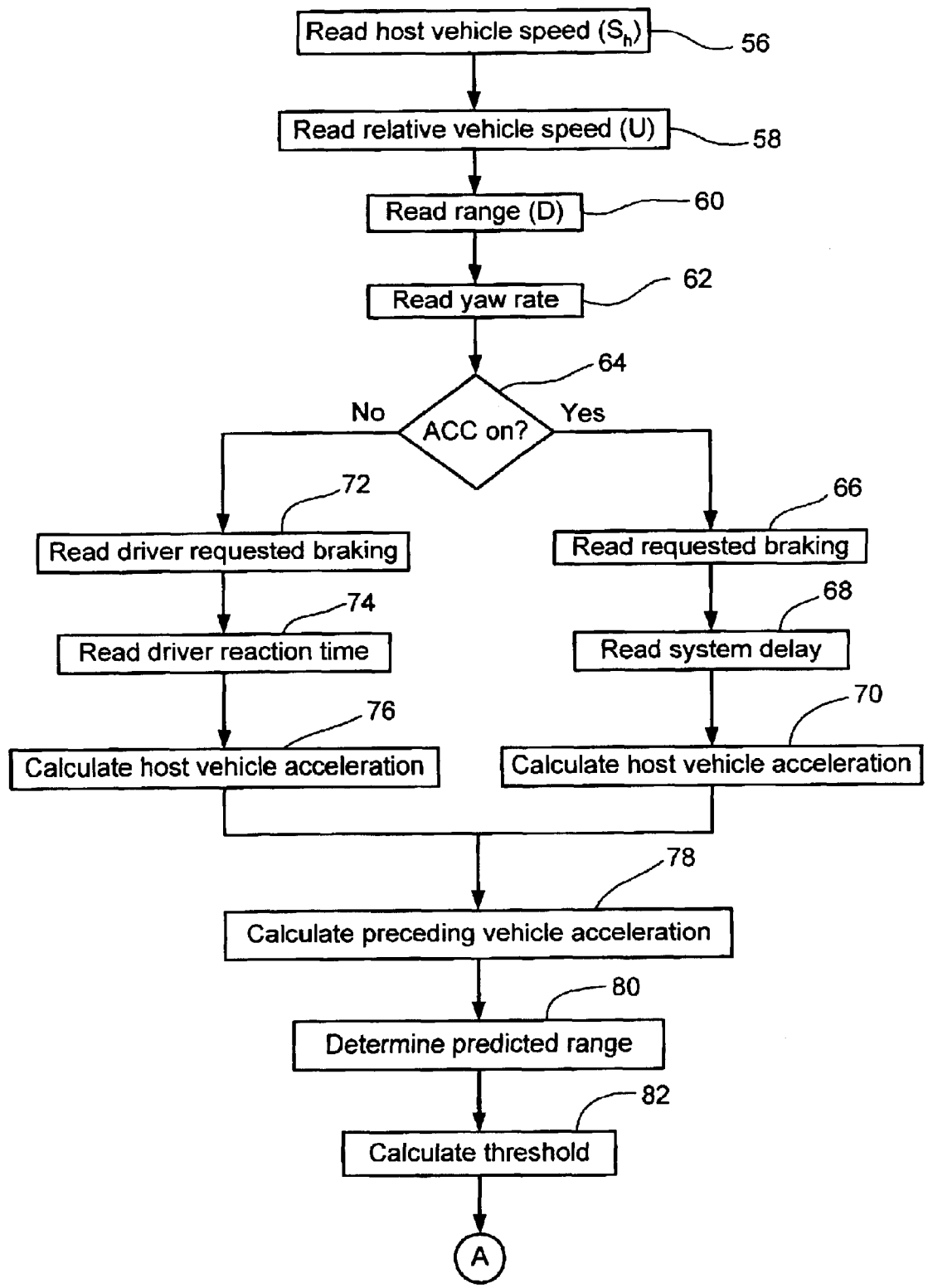
FIGS. 4a and 4b are a flow chart illustrating the operation of the driver alert system in accordance with the present invention.
Figure 4B:
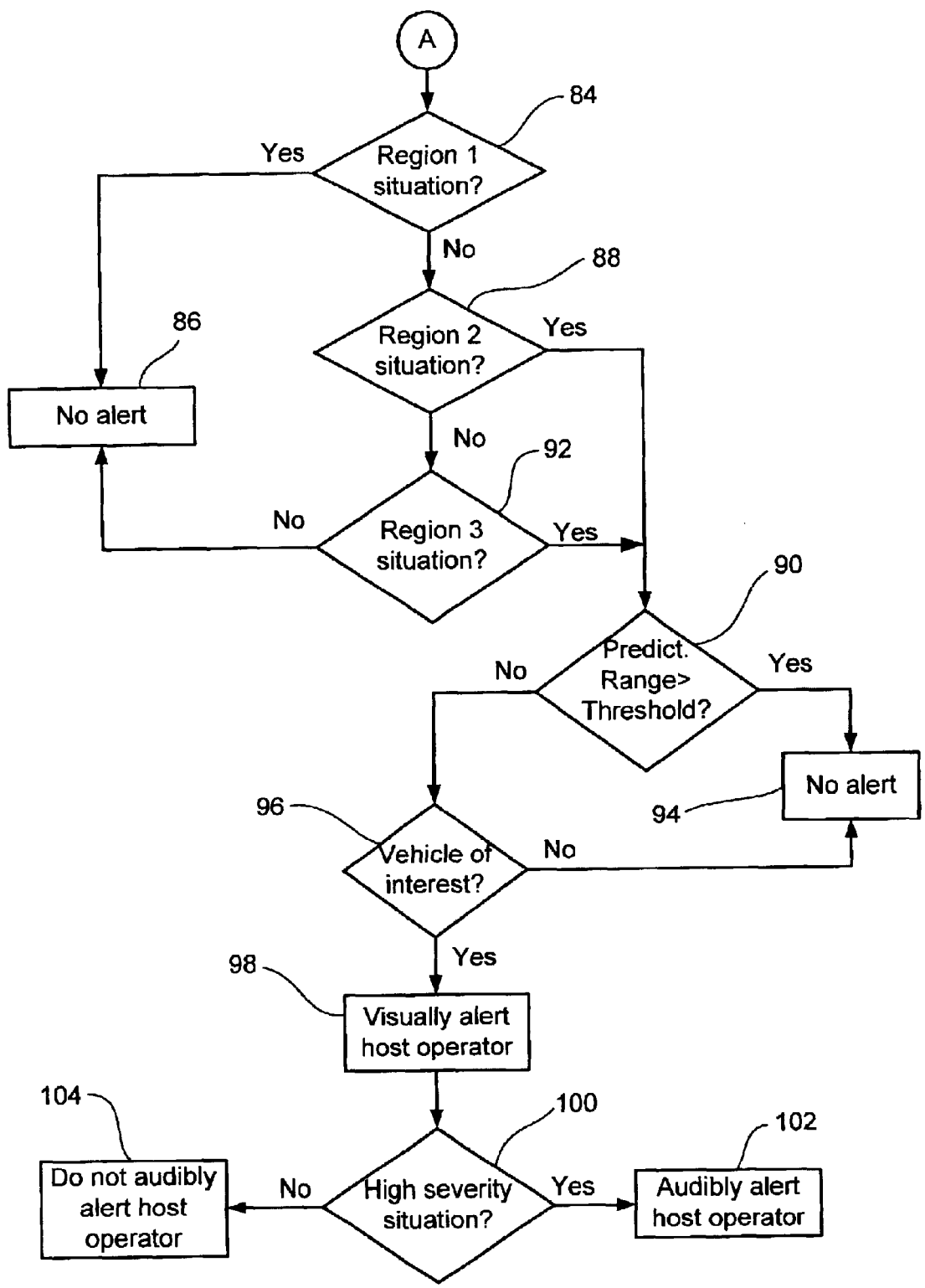

FIGS. 3, 4a, and 4b describe the process for detecting a vehicle operator alert situation and alerting the operator. Initially, the host vehicle speed, block 56, relative vehicle speed, block 58, range, block 60, and, optionally, yaw rate, block 62, are received. It is then determined if the ACC is on, block 64. If it is on, then the requested braking, block 66, and delay until braking of the ACC system, block 68, are determined. From these values, the host vehicle acceleration capability is calculated, block 70. (When calculating acceleration, the value will be negative since the vehicle is slowing down—or if calculating deceleration, the value will be positive.) If, on the other hand, the ACC is not on, then the driver requested braking, block 72, and approximation of the driver reaction time, block 74, are calculated. From these values, then, the host vehicle acceleration capability is calculated, block 76. Whether the ACC is on or off, the preceding vehicle acceleration is calculated, block 78. The predicted range is then determined, block 80. The predicted range is the range between the host vehicle and the preceding vehicle at a future time—with the future time being the time needed to match the host vehicle speed to the preceding vehicle speed. A threshold is calculated, block 82, based upon the severity of the situation between the host vehicle and the preceding vehicle for the regions of the phase plane.

The phase plane (see FIG. 3) is divided up into four regions by two axes—a relative speed axis (U) and a derivative of the relative speed axis (dU/dt), which is, in effect, the relative acceleration between the vehicles. Region 1 represents the vehicle situation where the initial relative speed is positive, meaning that the preceding vehicle is traveling at a higher initial speed than the host vehicle, and the relative acceleration is positive, meaning that the deceleration of the host vehicle is greater than the deceleration of the preceding vehicle, (i.e. the acceleration of the host vehicle has a larger negative value than that of the preceding vehicle). Region 2 represents the vehicle situation where the initial relative speed is negative, meaning that the preceding vehicle is traveling at a lower initial speed than the host vehicle, and the relative acceleration is positive, meaning that the deceleration of the host vehicle is greater than the deceleration of the preceding vehicle. Region 3 represents the vehicle situation where the initial relative speed is negative and the relative acceleration is negative. Region 4 represents the vehicle situation where the initial relative speed is positive, but the relative acceleration is negative. One will note that in this phase plane, region 1 is not of concern to the host vehicle operator since the range will actually increase over time. Region 4 is not generally of concern since the range will at first increase, unless the preceding vehicle continues to decelerate, which changes the vehicle situation to region 2 or 3. Regions 2 and 3 may have vehicle situations where an operator alert is required, depending upon the range and magnitudes of the relative velocities and relative accelerations, as well as the particular threshold.

Returning to FIGS. 4a and 4b, after calculating the threshold, block 82, it is determined if the vehicle situation is in region 1 of the phase plane, block 84. If the vehicle situation is in region 1, then no driver alert is initiated, block 86, and if not region 1, then it is determined if the vehicle situation is in region 2, block 88. If the vehicle situation is in region 2, then the current predicted range value is compared to the current threshold, block 90. If not in region 2, then it is determined if the vehicle situation is in region 3, block 92. If the vehicle situation is not in region 3, then no driver alert is initiated, block 86, but if it is in region 3 then the current predicted range value is compared to the current threshold, block 90. If the vehicle situation is in region 2 or 3 and the current predicted range value is greater than the current threshold value, then there is no driver alert, block 94—but, if the current predicted range value is not greater than the current threshold value, then it is determined if the preceding vehicle is of interest, block 96. If the preceding vehicle turns out to not be of interest, then there is no driver alert, block 84. If the preceding vehicle is of interest, then a visual alert is initiated for the operator of the host vehicle, block 98, and a consideration is made as to whether the vehicle situation is a high severity situation, block 100. If it is, then an audible alert is sent to the operator of the host vehicle in addition to the visual alert, block 102. But if not a high severity situation, then no audible alert is initiated, block 104.

Thus, the driver alert system 22 allows for different alert thresholds depending upon whether the ACC is on or off. If adaptive cruise control is on (ACC mode), then the vehicle operator is alerted if the system braking may not be sufficient, and if adaptive cruise control is off (normal driving mode), then the vehicle operator is alerted if the operator reaction time and braking may not be sufficient. In addition, the driver alert system 22 allows for different types of alert mechanisms depending upon the predicted severity of the vehicle situation. And, the driver alert system 22 is able to minimize nuisance alerts by utilizing regions in a phase plane created by axes representing the relative speed and relative acceleration between the host vehicle and the preceding vehicle.

While certain embodiments of the present invention have been described in detail, those familiar with the art to which this invention relates will recognize various alternative designs and embodiments for practicing the invention as defined by the following claims.

What is claimed is:

1. A method of detecting a driver alert situation for an operating host vehicle that precedes a preceding vehicle, the method comprising the steps of:
   determining a difference in speed between the host vehicle and the preceding vehicle;
   determining a difference in a rate of acceleration between the host vehicle and the preceding vehicle;
   determining a range between the host vehicle and the preceding vehicle;
   detecting if an adaptive cruise control system is on or off;
   determining an alert need, based upon the difference in speed and the difference in acceleration, if an adaptive cruise control deceleration is sufficient for the host vehicle to avoid the preceding vehicle if the adaptive cruise control system is on, and if a possible situation exists where the host vehicle will not avoid the preceding vehicle due to predicted inputs from a vehicle operator if the adaptive cruise control system is off; and
   providing a driver alert when the adaptive cruise control is detected as on and the adaptive cruise control deceleration is not sufficient for the host vehicle to avoid the preceding vehicle, and when the adaptive cruise control is detected as off and the possible situation exists that the host vehicle will not avoid the preceding vehicle.

2. The method of claim 1 further including the step of determining if a situation severity is high or low; and wherein the step of providing a driver alert includes providing a visual alert when the situation severity is low and providing the visual alert and an audible alert when the situation severity is high.

3. The method of claim 2 further including the step of determining a yaw rate, determining if the preceding vehicle is of interest, and preventing the step of providing a driver alert if the preceding vehicle is not of interest.

4. The method of claim 1 further including the step of determining a yaw rate, determining if the preceding vehicle is of interest, and preventing the step of providing a driver alert if the preceding vehicle is not of interest.

5. The method of claim 1 wherein the step of determining an alert need includes predicting a range between the host vehicle and the preceding vehicle at a future time, with the future time being the time needed to match the speed of the host vehicle to the speed of the preceding vehicle.

6. The method of claim 5 wherein the step of determining an alert need includes mapping the difference in speed and the difference in the rate of acceleration into one of four regions in a phase space division, generating an alert threshold in the one region, and comparing the mapping to the alert threshold in the one region.

7. The method of claim 1 wherein the step of determining an alert need includes mapping the difference in speed and the difference in the rate of acceleration into one of four regions in a phase space division, generating an alert threshold in the one region, and comparing the mapping to the alert threshold in the one region.

8. The method of claim 7 further including the step of determining if a situation severity is high or low; and wherein the step of providing a driver alert includes providing a visual alert when the situation severity is low and providing the visual alert and an audible alert when the situation severity is high.

9. The method of claim 7 further including the step of determining a yaw rate, determining if the preceding vehicle is of interest, and preventing the step of providing a driver alert if the preceding vehicle is not of interest.

10. A driver alert system for alerting a host vehicle operator relative to a preceding vehicle, with the host vehicle having an adaptive cruise control system, the driver alert system comprising:
    a plurality of inputs that receive a vehicle speed for the host vehicle, a relative speed between the host vehicle and the preceding vehicle, and a range between the host vehicle and the preceding vehicle;
    a requested braking determiner that calculates a first braking factor if the adaptive cruise control system is on and calculates a second braking factor if the adaptive cruise control system is off;
    a delay determiner that calculates a first delay time to braking if the adaptive cruise control system is on and calculates a second delay time to braking if the adaptive cruise control system is off;
    a host vehicle deceleration predictor that has inputs in communication with the requested braking determiner and the delay determiner;
    a preceding vehicle deceleration determiner;
    a range predictor that has inputs in communication with the host vehicle deceleration predictor, the preceding vehicle deceleration determiner, the relative speed between the host vehicle and the preceding vehicle, and the range between the host vehicle and the preceding vehicle;
    an alert threshold generator; and
    an alert decision determiner that is in communication with the alert threshold generator and the range predictor.

11. The driver alert system of claim 10 further including a situation severity determiner that is in communication with the alert decision determiner, and wherein the alert decision determiner has at least two levels of alert.

12. The driver alert system of claim 11 wherein the two levels of alert include a first level visual alert, and a second level audible alert, with the second level audible alert initiated for a situation severity that is higher than a situation severity for the first level visual alert.

13. The driver alert system of claim 12 further including an input that receives a yaw rate of the host vehicle, and a preceding vehicle filter that prevents the alert decision determiner from initiating an alert if the yaw rate indicates that the preceding vehicle is not of interest.

14. The driver alert system of claim 10 further including an input that receives a yaw rate of the host vehicle, and a preceding vehicle filter that prevents the alert decision determiner from initiating an alert if the yaw rate indicates that the preceding vehicle is not of interest.

15. The driver alert system of claim 10 wherein the alert decision determiner includes a relative acceleration determiner and a mapper that maps the relative speed and the relative acceleration into a phase space division, and a comparer that compares the mapped relative speed and the relative acceleration to an output of the alert threshold generator.

16. A driver alert system for alerting a host vehicle operator relative to a preceding vehicle, with the host vehicle having an adaptive cruise control system, the driver alert system comprising:
   a plurality of inputs that receive a vehicle speed for the host vehicle, a relative speed between the host vehicle and the preceding vehicle, and a range between the host vehicle and the preceding vehicle;
   a host vehicle deceleration predictor;
   a preceding vehicle deceleration determiner;
   a range predictor that has inputs in communication with the host vehicle deceleration predictor, the preceding vehicle deceleration determiner, the relative speed between the host vehicle and the preceding vehicle, and the range between the host vehicle and the preceding vehicle;
   an alert threshold generator; and
   an alert decision determiner that is in communication with the alert threshold generator and the range predictor, and with the alert decision determiner including a relative acceleration determiner and a mapper that maps the relative speed and the relative acceleration into a phase space division, and a comparer that compares the mapped relative speed and the relative acceleration to an output of the alert threshold generator.

17. The driver alert system of claim 16 wherein the step of determining an alert need includes mapping the difference in speed and the difference in the rate of acceleration into one of four regions in a phase space division, generating an alert threshold in the one region, and comparing the mapping to the alert threshold in the one region.

18. The driver alert system of claim 17 wherein the two levels of alert include a first level visual alert, and a second level audible alert, with the second level audible alert initiated for a situation severity that is higher than a situation severity for the first level visual alert.

19. The driver alert system of claim 16 further including an input that receives a yaw rate of the host vehicle, and a preceding vehicle filter that prevents the alert decision determiner from initiating an alert if the yaw rate indicates that the preceding vehicle is not of interest.

20. The driver alert system of claim 16 wherein the driver alert system further includes an alert initializer; and wherein the phase space division includes a first region where the relative speed is positive and the relative acceleration is positive, a second region where the relative speed is negative and the relative acceleration is positive, a third region where the relative speed is negative and the relative acceleration is negative, and a fourth region where the relative speed is positive and the relative acceleration is negative, and wherein the alert initialize is prevented from initializing a driver alert if the relative vehicle speed and the relative acceleration is mapped into one of the first and the fourth region.

* * * * *